United States Patent
Nakayama (10) Patent No.: US 8,849,330 B2
(45) Date of Patent: Sep. 30, 2014

(54) RADIO BASE STATION AND COMMUNICATION CONTROL METHOD

(75) Inventor: Taku Nakayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 313 days.

(21) Appl. No.: 13/386,879

(22) PCT Filed: Jul. 22, 2010

(86) PCT No.: PCT/JP2010/062365
§ 371 (c)(1),
(2), (4) Date: Jan. 24, 2012

(87) PCT Pub. No.: WO2011/010698
PCT Pub. Date: Jan. 27, 2011

(65) Prior Publication Data
US 2012/0122508 A1    May 17, 2012

(30) Foreign Application Priority Data

Jul. 24, 2009   (JP) ................................ 2009-172954

(51) Int. Cl.
*H04W 72/04*     (2009.01)
*H04L 5/00*      (2006.01)
*H04L 1/00*      (2006.01)
*H04W 72/08*     (2009.01)
*H04W 88/08*     (2009.01)

(52) U.S. Cl.
CPC ............ *H04W 72/082* (2013.01); *H04L 5/006* (2013.01); *H04L 1/0026* (2013.01); *H04L 5/0044* (2013.01); *H04L 1/0029* (2013.01); *H04L 5/0053* (2013.01); *H04W 88/08* (2013.01)
USPC .............................. 455/509; 455/513; 455/68

(58) Field of Classification Search
CPC combination set(s) only.
See application file for complete search history.

(56) References Cited

U.S. PATENT DOCUMENTS

2009/0005030 A1 *  1/2009  Han et al. ...................... 455/423
2009/0268838 A1   10/2009  Miki et al.
(Continued)

FOREIGN PATENT DOCUMENTS

JP        2007-306407 A      11/2007
JP       WO2009/016749    *   2/2009    ............... H04Q 7/22
(Continued)

OTHER PUBLICATIONS

3GPP TS 36.213 V8.4.0 "Technical Specification Group Radio Access Network; Evolved Universal Terrestrial Radio Access (E-UTRA); Physical Layer procedures (Release 8)", Sep. 2008.

(Continued)

*Primary Examiner* — Temesgh Ghebretinsae
*Assistant Examiner* — Dong-Chang Shiue
(74) *Attorney, Agent, or Firm* — Studebaker & Brackett PC (57) ABSTRACT

A control unit (102) in a radio base station (1A) receives from a radio terminal (2A) a measured W-CQI corresponding to a local sector, and also acquires the utilization ratio of a PDCCH corresponding to the sector. Also, in addition to receiving a measured W-CQI corresponding to the local sector, the control unit (102) in the radio base station (1A) acquires from other radio base stations (1B and 1C) utilization ratios of PDCCHs and PDSCHs corresponding to other sectors. Additionally, the control unit (102) in the radio base station (1A) estimates the PDCCH quality (SINR) corresponding to the local sector on the basis of a SINR obtained from the measured W-CQIs and also on the basis of the utilization ratios of PDCCHs and PDSCHs corresponding to other sectors.

6 Claims, 10 Drawing Sheets

(56) References Cited

U.S. PATENT DOCUMENTS

2010/0103817 A1* 4/2010 Takayanagi et al. ........ 370/230
2010/0118731 A1* 5/2010 Koyanagi .................... 370/252

FOREIGN PATENT DOCUMENTS

JP      2005-244960 A    9/2009
WO      2007/148588 A1  12/2007

OTHER PUBLICATIONS

3GPP TS 36.211 V8.4.0 "Technical Specification Group Radio Access Network; Evolved Universal Terrestrial Radio Access (E-UTRA); Physical Channels and Modulation (Release 8)", Sep. 2008.
International Search Report; PCT/JP2010/062365; Nov. 9, 2010.

* cited by examiner

RADIO BASE STATION AND COMMUNICATION CONTROL METHOD

TECHNICAL FIELD

The present invention relates to a radio base station configured such that a radio resource corresponding to a predetermined cell or sector is configured by a radio resource for transmitting control information and a radio resource for transmitting user data, the radio resource is assigned to a radio terminal, and communication is performed with the radio terminal, and relates also to a communication control method of the radio base station.

BACKGROUND ART

In recent years, ongoing increase to capacity and speed is required in response to implementation of broadband to mobile communication services. In this regard, a 3rd-generation mobile communication system represented by W-CDMA (Wideband Code Division Multiple Access) or the next-generation mobile communication system, which is an alternative to a 3.5th-generation mobile communication system, has been commercialized all over the world. Also in Japan, frequency assignment to a 3.9th-generation mobile communication system, which is positioned as a mobile communication system leading to a 4th-generation mobile communication system, has begun. In the 3.9th-generation mobile communication system, LTE (Long Term Evolution) is the most powerful candidate for a standard leading to the 4th-generation mobile communication system.

In the LTE, OFDMA (Orthogonal Frequency Division Multiplexing Access) is adopted for downlink communication toward a radio terminal from a radio base station, and SC-FDMA (Single Carrier Frequency Division Multiplexing Access) is adopted for uplink communication toward the radio base station from the radio terminal. In these multiplexing methods, user multiplexing is achieved by arranging a radio resource in the two dimension of frequency and time.

A frequency band, which is a downlink radio resource, is divided in units of a resource block (RB). The RB includes a control information channel (PDCCH: Physical Downlink Control CHannel), which is a time slot as a radio channel for downlink control information transmission, and a shared data channel (PDSCH: Physical Downlink Shared CHannel) which is a time slot as a radio channel for transmitting downlink user data.

PRIOR ART DOCUMENT

Non-Patent Document

Non-Patent Document 1: 3GPP TS 36.213 V8.4.0 "Technical Specification Group Radio Access Network; Evolved Universal Terrestrial Radio Access (E-UTRA); Physical Layer procedures (Release 8)"
Non-Patent Document 2: 3GPP TS 36.211 V8.4.0 "Technical Specification Group Radio Access Network; Evolved Universal Terrestrial Radio Access (E-UTRA); Physical Channels and Modulation (Release 8)"

SUMMARY OF THE INVENTION

In LTE, in order to realize an increase in speed and capacity, an extremely high frequency use efficiency is required as compared to the conventional 3rd-generation mobile communication system and 3.5th-generation mobile communication system. In order to realize this requirement, an operation in which the same frequency is used in proximate cells or sectors is assumed in LTE. However use of this type of operation may entail the problem of interference to a given cell or sector from other cell or other sector.

Therefore, a radio base station must understand the quality (SINR) of PDSCH and PDCCH in a radio terminal which fluctuates due to interference, and must perform control such that the quality satisfies a required level. Particularly, the information transmitted by PDCCH includes different types of control information required to receive the information transmitted by PDSCH. Therefore, a radio terminal must properly receive the control information transmitted by PDCCH, and for this, it is important for the radio base station to perform control such that the quality of PDCCH satisfies the required level.

However, based on the LTE standard, a radio terminal transmits only the quality of PDSCH to a radio base station, and does not transmit the quality of PDCCH. Therefore, the radio base station used to assume the quality of PDSCH from the radio terminal as the quality of PDCCH and used to perform control such that the quality of PDCCH would satisfy the required level. However, generally, the utilization ratio of a radio resource of PDCCH is lower than the utilization ratio of a radio resource of PDSCH, and therefore, as compared to PDSCH, it is difficult for PDCCH to receive interference from other cell or other sector. Therefore, if the quality of PDSCH is assumed to be the quality of PDCCH, the quality of PDCCH would be estimated to be extremely low, giving rise to a problem that the number of repetitions of transmission of the same information would increase and more than the required number of radio resources would be used. Therefore, the quality of PDCCH in a radio terminal is required to be estimated appropriately.

Therefore, it is an object of the present invention to provide a radio base station and a communication control method enabling suitable estimation of a radio resource quality.

To solve the above problem, the present invention has following features. A first feature of the present invention is summarized as a radio base station (radio base station 1A, radio base station 1B, radio base station 1C) forming a predetermined cell or sector, assigning a radio resource to a radio terminal (radio terminal 2A, radio terminal 2B, radio terminal 2C), and performing a communication with the radio terminal, wherein a radio resource corresponding to the predetermined cell or sector includes a radio resource for transmitting control information and a radio resource for transmitting user data, the radio base station comprising: a first acquisition unit (W-CQI acquisition unit 152) configured to acquire an average quality of a radio resource for transmitting user data included in the radio resource corresponding to the predetermined cell or sector; a second acquisition unit (PDCCH utilization ratio acquisition unit 154, PDSCH utilization ratio acquisition unit 156) configured to acquire at least either one of an utilization ratio of a radio resource for transmitting control information or an utilization ratio of a radio resource for transmitting user data, included in a radio resource corresponding to other cell or other sector formed by other radio base station, from the other radio base station; and an estimation unit (SINR estimation unit 158) configured to estimate a quality of a radio resource for transmitting control information included in the radio resource corresponding to the predetermined cell or sector based on the average quality of the radio resource for transmitting user data acquired by the first acquisition unit, and at least either one of the utilization ratio of the radio resource for transmitting control information or the utilization ratio of the radio resource for transmitting user data acquired by the second acquisition unit.

Such a radio base station acquires the average quality of a radio resource for transmitting user data included in the predetermined radio resource corresponding to the predetermined cell or sector formed by the local radio base station, and at the same time, acquires at least either one of the utilization ratio of the radio resource for transmitting control information or the utilization ratio of the radio resource for transmitting user data included in the radio resource corresponding to other cell or other sector formed by other radio base station from other radio base station. Additionally, based on the acquired average quality of the radio resource for transmitting user data, and at least either one of the utilization ratio of the radio resource for transmitting control information or the utilization ratio of the radio resource for transmitting user data, the radio base station estimates the quality of the radio resource for transmitting control information included in the radio resource corresponding to the predetermined cell or sector.

Therefore, the radio base station can perceive an accurate value concerning at least either one of the utilization ratio of the radio resource for transmitting control information or the utilization ratio of the radio resource for transmitting user data included in a radio resource corresponding to other cell or other sector, and can additionally estimate the quality of the radio resource for transmitting control information included in a radio resource corresponding to a predetermined cell or sector more accurately.

A second feature of the present invention according to the first feature is summarized as that the estimation unit calculates the quality of the radio resource for transmitting control information included in the radio resource corresponding to the predetermined cell or sector, by multiplying the average quality of the radio resource for transmitting user data to a value obtained by dividing the utilization ratio of the radio resource for transmitting user data by the utilization ratio of the radio resource for transmitting control information.

A third feature of the present invention according to the first feature is summarized as that the estimation unit calculates a correction value with respect to the average quality of the radio resource for transmitting user data based on the utilization ratio of the radio resource for transmitting control information, and calculates the quality of the radio resource for transmitting control information included in the radio resource corresponding to the predetermined cell or sector by adding the correction value to the average quality of the radio resource for transmitting user data.

A forth feature of the present invention according to the first to third features is summarized as the radio base station comprising a third acquisition unit configured to acquire a location of the radio terminal, wherein the estimation unit performs weighting for at least either one of the utilization ratio of a radio resource for transmitting control information or the utilization ratio of a radio resource for transmitting user data, included in a radio resource corresponding to the other cell or the other sector, in accordance with a distance from the location of the radio terminal up to the location of the other cell or the other sector.

A fifth feature of the present invention according to the first to third features is summarized as that the estimation unit performs weighting for at least either one of the utilization ratio of a radio resource for transmitting control information or the utilization ratio of a radio resource for transmitting user data included in a radio resource corresponding to the other cell or the other sector in accordance with the distance from the location of the predetermined cell or sector up to the location of the other cell or the other sector.

A sixth feature of the present invention is summarized as a communication control method of a radio base station forming a predetermined cell or sector, assigning a radio resource to a radio terminal, and performing a communication with the radio terminal, wherein a radio resource corresponding to the predetermined cell or sector includes a radio resource for transmitting control information and a radio resource for transmitting user data, the communication control method comprising the steps of: a step in which the radio base station acquires an average quality of a radio resource for transmitting user data included in a radio resource corresponding to the predetermined cell or sector; a step in which the radio base station acquires at least either one of an utilization ratio of a radio resource for transmitting control information or an utilization ratio of a radio resource for transmitting user data, included in a radio resource corresponding to other cell or other sector formed by other radio base station, from the other radio base station; and a step in which the radio base station estimates the quality of a radio resource for transmitting control information included in the radio resource corresponding to the predetermined cell or sector based on the obtained average quality of the radio resource for transmitting user data, and at least either one of the acquired utilization ratio of the radio resource for transmitting control information or the acquired utilization ratio of the radio resource for transmitting user data.

(Additional Remark)

The gist of the present invention is a radio base station so configured that a predetermined cell or sector is formed, a radio resource corresponding to the predetermined cell or sector is configured by a radio resource for transmitting control information and a radio resource for transmitting user data, the radio resource is assigned to a radio terminal, and communication is performed with the radio terminal, the radio base station comprising an acquisition unit configured to acquire at least either one of the utilization ratio of the radio resource for transmitting control information or the utilization ratio of the radio resource for transmitting user data included in a radio resource corresponding to other cell or other sector, which is a cell or a sector formed by other radio base station, from the other radio base station.

Such a radio base station acquires at least either one of the utilization ratio of the radio resource for transmitting control information or the utilization ratio of the radio resource for transmitting user data included in the radio resource corresponding to other cell or other sector formed by other radio base station, from the other radio base station.

Therefore, the radio base station can perceive an accurate value concerning at least either one of the utilization ratio of the radio resource for transmitting control information or the utilization ratio of the radio resource for transmitting user data included in the radio resource corresponding to other cell or other sector, and additionally, based on these utilization ratios and the average quality of the radio resource for transmitting user data included in the radio resource corresponding to a predetermined cell or sector formed by the local radio base station, the radio base station can more accurately estimate the quality of the radio resource for transmitting control information included in the radio resource corresponding to the predetermined cell or sector.

The gist of the present invention is a communication method in a radio communication system that includes a first radio base station (radio base station 1B and radio base station 1C) and a second radio base station (radio base station 1A), the method comprising: a step in which the first radio base station transmits information about a utilization ratio of a radio resource for transmitting control information included in a radio resource corresponding to a cell or a sector formed by the first radio base station; and a step in which the second radio base station receives information about a utilization ratio of a radio resource for transmitting control information from the first radio base station.

The present invention enables suitable estimation of a radio resource quality.

MODES FOR CARRYING OUT THE INVENTION

Next, an embodiment of the present invention will be described with reference to the drawings. More specifically, (1) Configuration of Radio Communication System, (2) Operation of Radio Base Station, (3) Operation and Effect, and (4) Other Embodiments will be described. It is to be noted that the same or similar reference numerals are applied to the same or similar parts through the drawings in the following embodiments.

Figure 1:
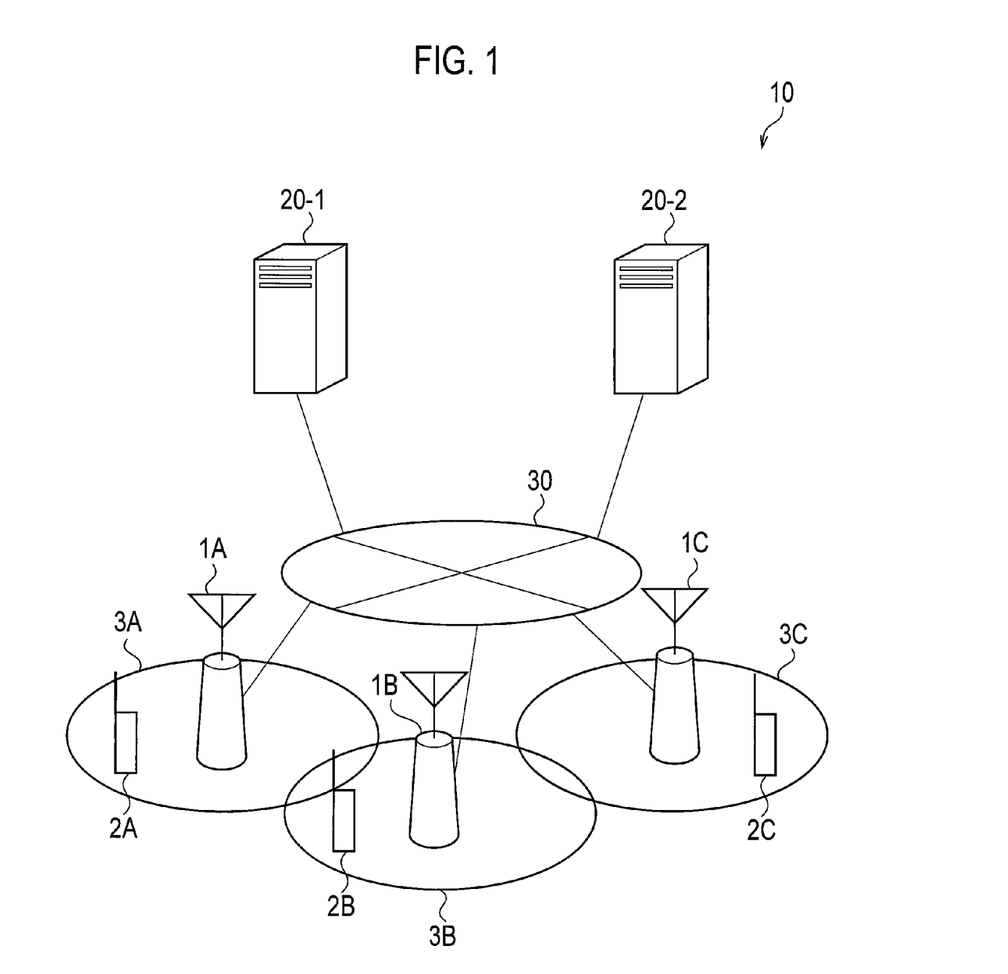
FIG. 1 is a diagram showing the entire schematic configuration of a radio communication system according to an embodiment of the present invention.

(1) Configuration Of Radio Communication System (1.1) Entire Schematic Configuration of Radio Communication System FIG. 1 is a diagram showing the entire schematic configuration of a radio communication system 10 according to an embodiment of the present invention.

The radio communication system 10 illustrated in FIG. 1 has a configuration based on LTE (Long Term Evolution) which is a standard designed in 3GPP. The radio communication system 10 includes a radio base station 1A, a radio base station 1B, a radio base station 1C, a radio terminal 2A, a radio terminal 2B, a radio terminal 2C, MME (Mobile Management Entity)/SGW (Serving Gateway) 20-1 and MME/SGW 20-2, which are transfer control devices, and a backbone network 30.

In FIG. 1, the radio terminal 2A exists in a cell 3A formed by the radio base station 1A. Furthermore, the radio terminal 2B exists in a cell 3B formed by the radio base station 1B, and the radio terminal 2C exists in a cell 3C formed by the radio base station 1C. The cell 3A through the cell 3C are divided into a plurality of sectors (not shown).

The radio base station 1A performs communication with the radio terminal 2A which exists in the cell 3A. Similarly, the radio base station 1B performs communication with the radio terminal 2B which exists in the cell 3B, and the radio base station 1C performs communication with the radio terminal 2C which exists in the cell 3C.

Between the radio base station 1A through the radio base station 1C and MME/SGW 20-1 and 20-2 is established an S1 connection, which is a logical transmission path of a transport layer, via the backbone network 30. Furthermore, between the radio base station 1A through the radio base station 1C is established an X2 connection, which is a logical transmission path of a transport layer, via the backbone network 30.

(1.2) Configuration of Radio Base Station

Figure 2:
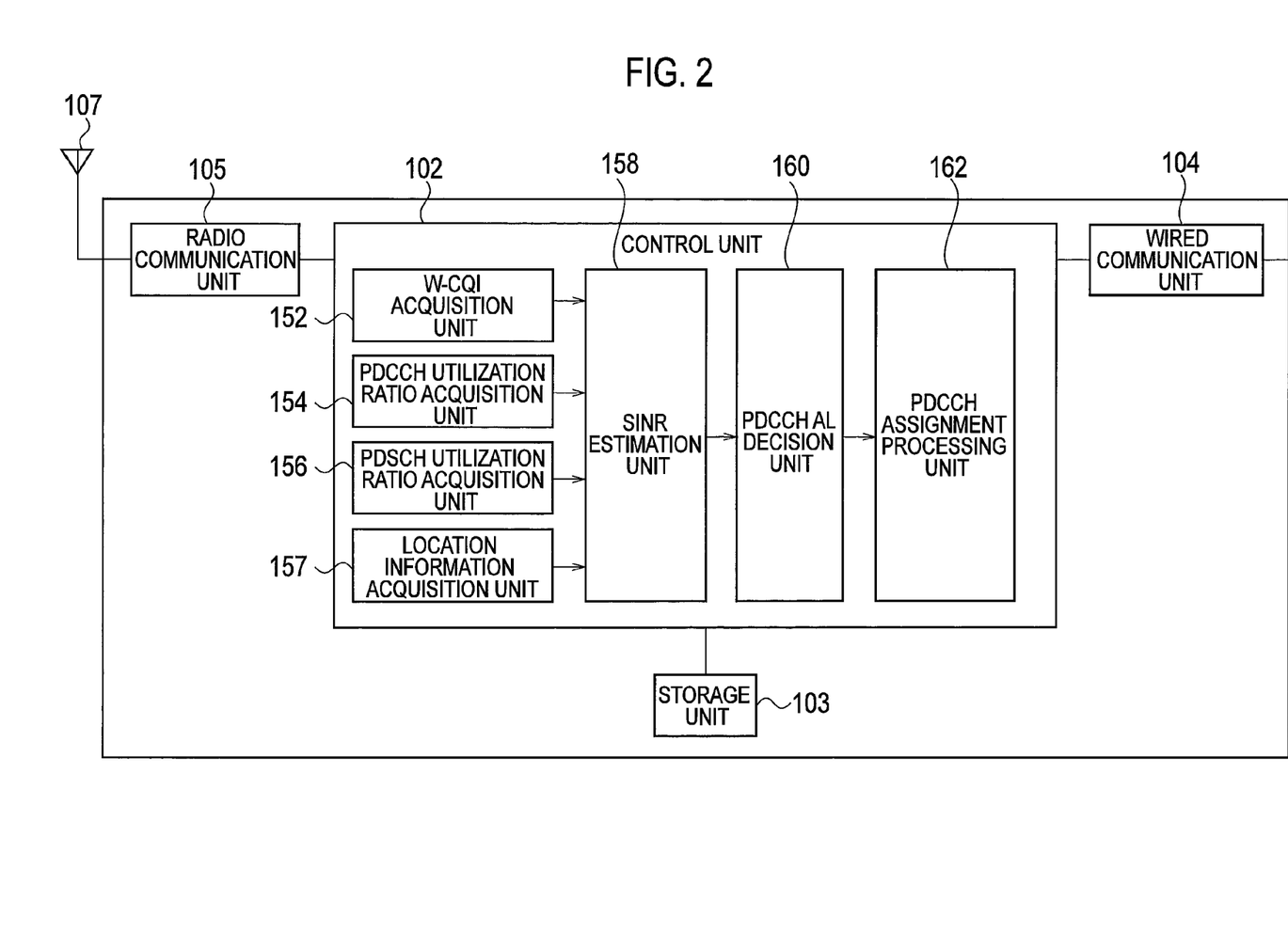
FIG. 2 is a diagram illustrating the configuration of a radio base station according to the embodiment of the present invention.

FIG. 2 is a diagram showing a configuration of the radio base station 1A. The radio base station 1A shown in FIG. 2 includes a control unit 102, a storage unit 103, a wired communication unit 104, a radio communication unit 105, and an antenna 107. Note that the radio base station 1B and the radio base station 1C also have the same configuration as the radio base station 1A.

The control unit 102 is configured by for example, a CPU, and controls various functions of the radio base station 1A. The storage unit 103 is configured by, for example, a memory, and stores various types of information used for control and the like of the radio base station 1. The wired communication unit 104 is connected to the backbone network 30 via a router, etc. (not shown). The radio communication unit 105 receives a radio signal from the radio terminal 2A via the antenna 107, and at the same time, transmit a radio signal to the radio terminal 2A.

Next, detailed control of the control unit 102 will be described. In accordance with the channel quality required by the radio terminal 2A that exists within a predetermined sector (hereinafter called the "local sector") configuring the cell 3A formed by the radio base station 1A, the control unit 102 assigns a single or a plurality of resource blocks (RB), which are downlink radio resources, to the radio terminal 2A.

The RB includes two types of radio channels, in detail, a control information channel (PDCCH) and a shared data channel (PDSCH). A region of the PDCCH reaches from the head of the RB to three OFDM symbols at maximum, and the region of the PDSCH is the OFDM symbols following the PDCCH. In the present embodiment, the RB to be assigned has a continuing frequency band.

The channel quality required by each radio terminal in the local sector differs. In accordance with the channel quality required by each radio terminal, the control unit 102 sets the RBs to be assigned to the radio terminals as well as their number, and then assigns them. Specifically, the control unit 102 assigns PDSCH and PDCCH within RB to each radio terminal within the local sector. Furthermore, in accordance with the channel quality required by each radio terminal, the control unit 102 sets a communication scheme, such as a modulation method, an encoding rate, the number of times of re-transmissions, and MIMO (Multiple-Input Multiple-Output).

Figure 3:
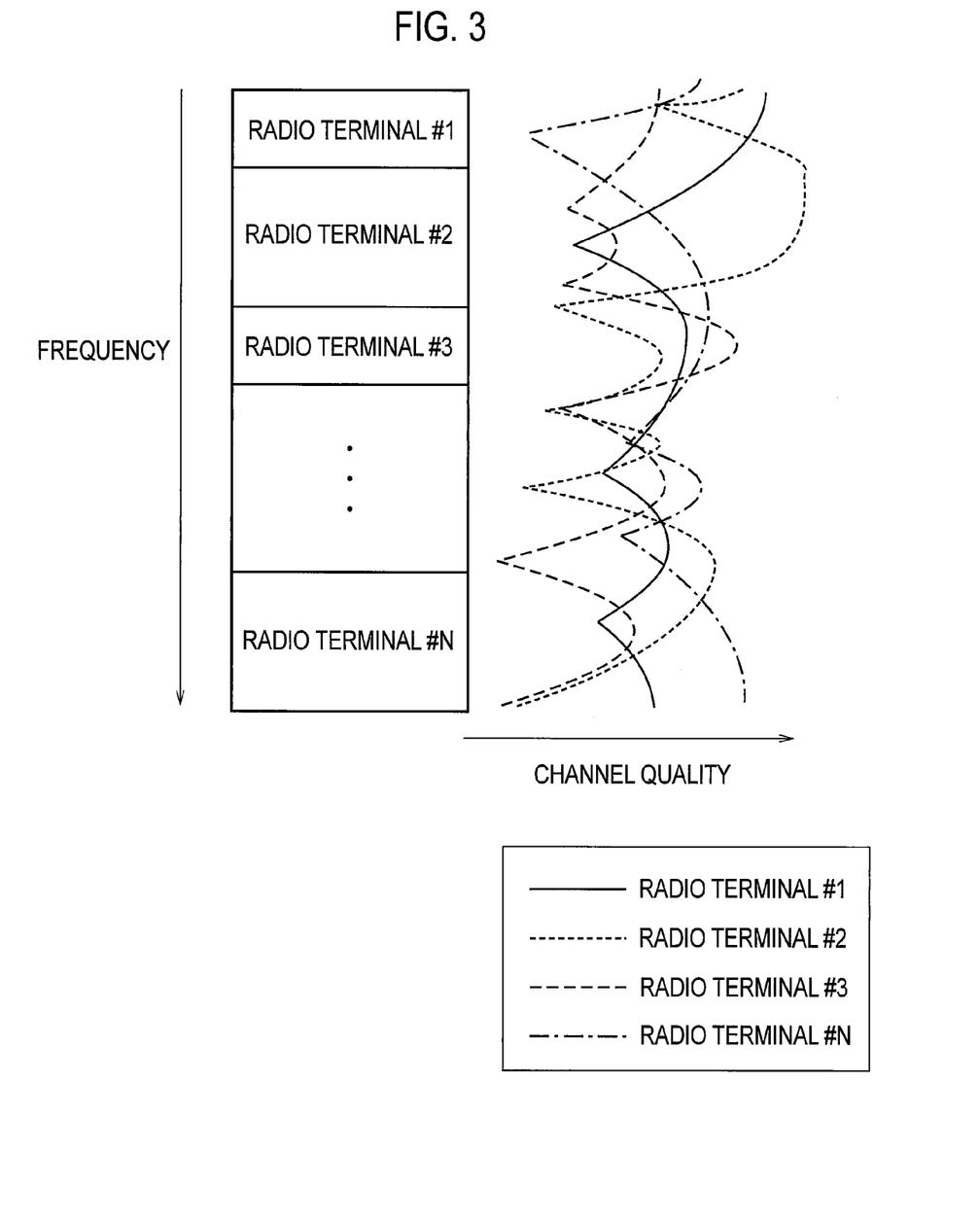
FIG. 3 is a diagram showing an example of PDSCH assignment by the radio base station according to the embodiment of the present invention.

FIG. 3 is a diagram showing an example of PDSCH assignment. FIG. 3 is an example of a case in which the radio terminal 2A within the local sector is a plurality of radio terminals #1 through the radio terminal #N. In FIG. 3, the control unit 102 assigns PDSCH corresponding to a frequency band in which the channel quality is higher than the level required by the radio terminal #1, to the radio terminal #1 which exists within the local sector.

Similarly, the control unit 102 assigns PDSCHs corresponding to frequency bands in which the channel quality is higher than the level required by the radio terminal #2 through the radio terminal #N, to the radio terminal #2 through the radio terminal #N which exist within the local sector.

The PDCCH includes various types of information required for receiving user data included in the PDSCH. Accordingly, when it is not possible to receive the information included in the PDCCH, it is not possible for a radio terminal to receive the user data included in the PDSCH. In this regard, the PDCCH is a very important radio channel.

Specifically, PDCCH includes various types of control information of a downlink radio resource and DCI (Downlink Control Information) of each radio terminal. PDCCH of single TTI (Transmission Time Interval) can store DCI corresponding to a plurality of radio terminals.

The number of repetitions when DCI corresponding to a single radio terminal within PDCCH of single TTI is stored repeatedly is called an aggregation level (AL).

In order that the quality of PDCCH satisfies the SINR (Signal to Interference and Noise Ratio) corresponding to AL, the control unit 102 decides the AL for the DCI of each radio terminal, and thus adjustment of the encoding rate due to repetition is realized and the characteristics can be improved. However, as described above, the region of the PDCCH reaches only from the head of the RB to three OFDM symbols at maximum. Therefore, when AL is high, in other words, the higher the number of repetitions of DCI, the lower the number of radio terminals corresponding to the DCI that can be stored within PDCCH of a single TTI. That is, the AL and the number of radio terminals corresponding to the DCI that can be stored within PDCCH of a single TTI are in a trade-off relationship.

Furthermore, the more the number of OFDM symbols corresponding to the region of PDCCH, the more the number of radio terminals corresponding to the DCI that can be stored within PDCCH of a single TTI. However, due to a reduction in the OFDM symbols corresponding to the region of PDSCH, the encoding rate of PDSCH declines. Therefore, the AL and the reception performance of PDSCH are in a trade-off relationship.

Figure 4:
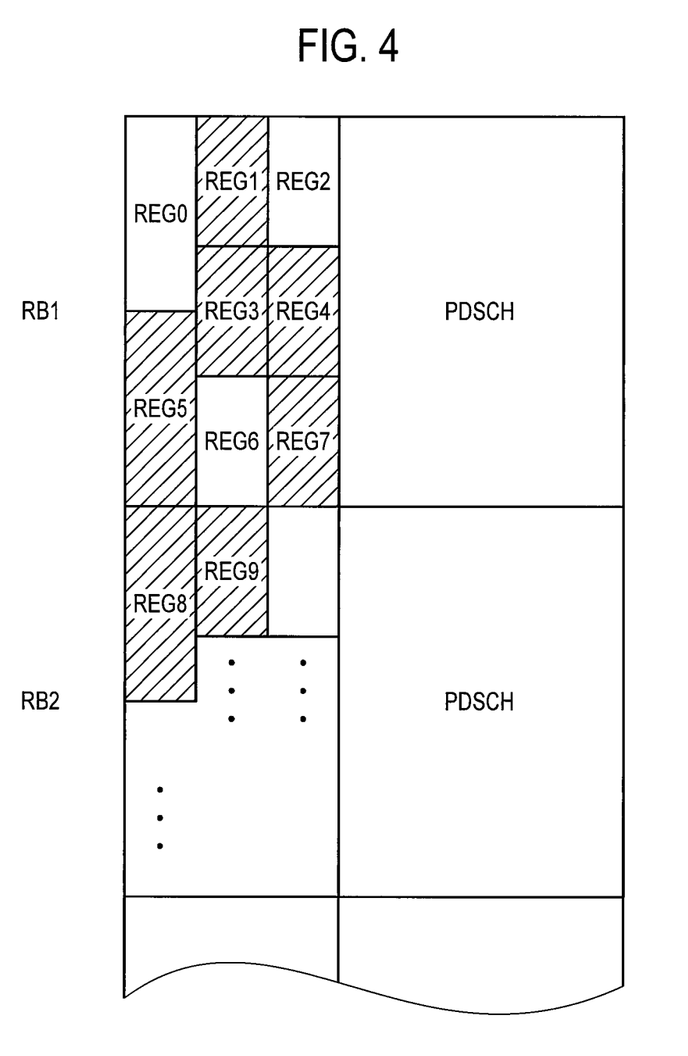
FIG. 4 is a diagram showing an example of REG assignment within PDCCH by the radio base station according to the embodiment of the present invention.

The control unit 102 assigns the REGs (Resource Element Group) of PDCCH to the radio terminals. FIG. 4 is a diagram showing an example of REG assignment within PDCCH.

First of all, the control unit 102 performs error correction encoding for each DCI and arranges the DCI that has been repeated for a number of times that corresponds to AL in a one-dimensional region. At this point, the control unit 102 selects the storage location of DCI in the one-dimensional region from the specific values that the DCI has, for example, RNTI of the corresponding radio terminal, and the options decided on a quasi-random basis by AL. As for the one-dimensional region in which no DCI could be assigned as a result of execution of this process for the entire DCI, the region is left as is without any information.

Subsequently, the control unit 102 divides the region within the OFDM symbols serving as the region of PDCCH into REGs. Additionally, the control unit 102 stores the DCI in which the interleave process has been performed with eight bits of the bit sequence of the one-dimensional region as the unit in the REGs corresponding to the assigned location, sequentially from the REG with the lowest frequency. Thus, the DCI is stored in the REG unit on a quasi-random basis in PDCCH, and a frequency diversity effect is achieved.

In the present embodiment, prior to the assignment of RB to the radio terminal, the control unit 102 estimates the quality of PDCCH (SINR) corresponding to the local sector.

Figure 5:
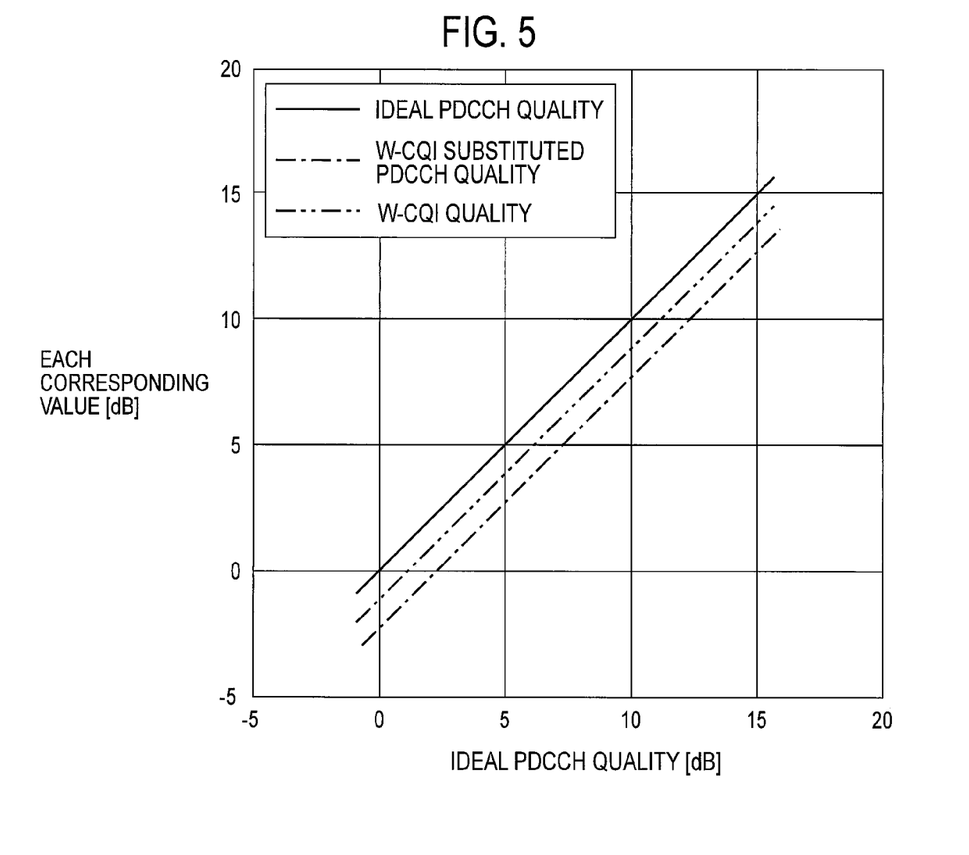
FIG. 5 is a diagram showing a correspondence relationship among an ideal PDCCH quality, a W-CQI substituted PDCCH quality, and a W-CQI quality according to the embodiment of the present invention.

FIG. 5 is a diagram showing a correspondence relationship among: an ideal quality of PDCCH corresponding to the local sector (ideal PDCCH quality); a quality which is substituted for the PDCCH quality that is evaluated from W-CQI (measured W-CQI) measured in the radio terminal 2A (W-CQI substituted PDCCH quality); and the quality obtained from W-CQI corresponding to the local sector (W-CQI quality).

Conventionally, the W-CQI substituted PDCCH quality that was used as PDCCH corresponding to the local sector is approximately 2 [db] lower than the ideal PDCCH quality, as shown in FIG. 5. In the present embodiment, the estimated value of the quality of PDCCH corresponding to the local sector is appropriated closer to the ideal PDCCH quality rather than the W-CQI substituted PDCCH quality. Note that in FIG. 5, the reason that the W-CQI substituted PDCCH quality is lower than W-CQI is because of the effect of decimal round-off during quantization at the time of conversion of SINR to CQI.

A modeling of interference of PDCCH that is required for an estimation of quality of PDCCH corresponding to the local sector is explained below.

Figure 6:
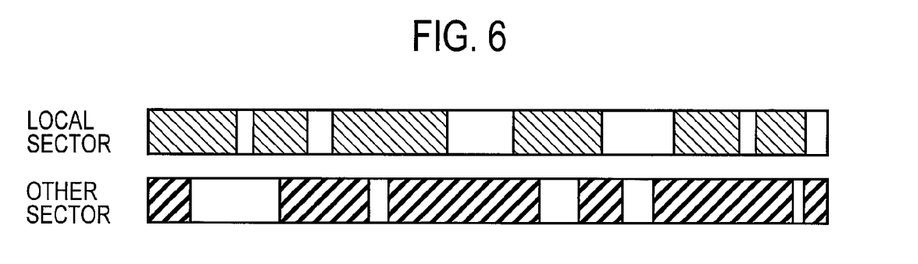
FIG. 6 is a diagram showing an example of a usage status of PDCCH according to the embodiment of the present invention.

In the PDCCH corresponding to the local sector, as described above, both used REGs and unused REGs exist. Furthermore, even in the PDSCH corresponding to other sector, both used REGs and unused REGs exist. FIG. 6 is a diagram showing an example of a usage status of the PDCCH corresponding to the local sector and a usage status of the PDCCH corresponding to other sector.

In the PDCCH corresponding to the local sector, the power of the PDCCH corresponding to other sector (the other sector) having the same frequency band as the local sector acts as interference. The interference power $I_{PDCCH}$ that the PDCCH corresponding to the local sector receives from the PDCCH in the j-th other sector is represented by the following Equation (1), when the transmission power corresponding to the j-th other sector is $TxPower_j$, the transmission loss power corresponding to the j-th other sector is $PathLoss_j$, and the power of the channel in the j-th other sector is $ChannelPower_j$:

$$I_{PDCCH} = \sum_{j \neq ServingSector}^{NumSector} \beta_j (TxPower_j - PathLoss_j) \cdot ChannelPower_j \qquad \text{[Equation 1]}$$

$$= \sum_{j \neq ServingSector}^{NumSector} \beta_j \cdot InterferencePower_j$$

Here, $\beta_j$ is the utilization ratio of the PDCCH corresponding to the j-th other sector.

Furthermore, in the PDSCH corresponding to the local sector, the power of the PDSCH corresponding to other sector (the other sector) having the same frequency band as the local sector acts as interference. The interference power $I_{PDSCH}$ that the PDSCH corresponding to the local sector receives from the PDSCH in the j-th other sector is represented by the following Equation (2), when the transmission power corresponding to the j-th other sector is $TxPower_j$, the transmission loss power corresponding to the j-th other sector is $PathLoss_j$, and the power of the channel in the j-th other sector is $ChannelPower_j$:

$$I_{PDSCH} = \sum_{j \neq ServingSector}^{NumSector} \gamma_j (TxPower_j - PathLoss_j) \cdot ChannelPower_j$$

$$= \sum_{j \neq ServingSector}^{NumSector} \gamma_j \cdot InterferencePower_j$$

[Equation 2]

Here, $\gamma_j$ is the utilization ratio of the PDSCH corresponding to the j-th other sector.

For the estimation of the quality of PDCCH corresponding to the local sector and for the assignment of PDCCH corresponding to the local sector, the control unit 102 includes a W-CQI acquisition unit 152, a PDCCH utilization ratio acquisition unit 154, a PDSCH utilization ratio acquisition unit 156, a location information acquisition unit 157, an SINR estimation unit 158, a PDCCH AL decision unit 160, and a PDCCH assignment processing unit 162 as shown in FIG. 2.

The control unit 102 performs estimation of the quality of PDCCH corresponding to the local sector using a calculation equation, and estimation of the quality of PDCCH corresponding to the local sector using a correction value.

The following process is executed when the quality of PDCCH corresponding to the local sector is estimated using a calculation equation.

The radio terminal 2A measures W-CQI corresponding to the average quality of PDSCH included in a downlink radio resource corresponding to the local sector. Additionally, the radio terminal 2A transmits the measured W-CQI (measured W-CQI) to the radio base station 1A.

The W-CQI acquisition unit 152 in the control unit 102 of the radio base station 1A receives the measured W-CQI corresponding to the local sector from the radio terminal 2A via the antenna 107 and the radio communication unit 105.

The radio base station 1B and the radio base station 1C acquire the utilization ratio β of PDCCH corresponding to a sector (the other sector) of the radio base station 1B and the radio base station 1C. Additionally, the radio base station 1B and the radio base station 1C transmit the utilization ratio β of PDCCH corresponding to a sector (the other sector) of the radio base station 1B and the radio base station 1C to the radio base station 1A via the X2 connection or the S1 connection.

The PDCCH utilization ratio acquisition unit 154 in the control unit 102 of the radio base station 1A receives the utilization ratio β of PDCCH corresponding to the other sector from the radio base station 1B and the radio base station 1C via the X2 connection or the S1 connection, and the wired communication unit 104.

Furthermore, the radio base station 1B and the radio base station 1C acquire the utilization ratio γ of PDSCH corresponding to a sector (the other sector) of the radio base station 1B and the radio base station 1C. Additionally, the radio base station 1B and the radio base station 1C transmit the utilization ratio γ of PDSCH corresponding to a sector (the other sector) of the radio base station 1B and the radio base station 1C to the radio base station 1A via the X2 connection or the S1 connection.

The PDSCH utilization ratio acquisition unit 156 in the control unit 102 of the radio base station 1A receives the utilization ratio γ of PDSCH corresponding to the other sector from the radio base station 1B and the radio base station 1C via the X2 connection or the S1 connection, and the wired communication unit 104.

Furthermore, the radio terminal 2A is equipped with a GPS function, and detects the location information (longitude and latitude) of the radio terminal 2A. Additionally, the radio terminal 2A transmits the location information of the radio terminal 2A to the radio base station 1A.

The location information acquisition unit 157 in the control unit 102 of the radio base station 1A receives the location information of the radio terminal 2A from the radio terminal 2A via the antenna 107 and the radio communication unit 105.

The SINR estimation unit 158 in the control unit 102 of the radio base station 1A estimates the quality of PDCCH (SINR) corresponding to the local sector based on the quality (SINR) obtained from the measured W-CQI corresponding to the local sector which is received by the W-CQI acquisition unit 152, the utilization ratio β of PDCCH corresponding to the other sector which is received by the PDCCH utilization ratio acquisition unit 154, the utilization ratio γ of PDSCH corresponding to the other sector which is received by the PDSCH utilization ratio acquisition unit 156, and the location information of the radio terminal 2A which is received by the location information acquisition unit 157.

Specifically, the SINR estimation unit 158 reads the location information of each of the other sectors stored in the storage unit 103. Subsequently, the SINR estimation unit 158 calculates the distance between the radio terminal 2A and each of the other sectors based on the location information of the radio terminal 2A and the location information of each of the other sectors. Additionally, the SINR estimation unit 158 performs the weighting process for the utilization ratio β of PDCCH and the utilization ratio γ of PDSCH corresponding to the other sector such that the values become large as the distance between the other sector and the radio terminal 2A reduces.

Alternatively, the SINR estimation unit 158 can also perform weighting for the utilization ratio β of PDCCH and the utilization ratio γ of PDSCH corresponding to the other sector as described below. The SINR estimation unit 158 reads the location information of the local sector stored in the storage unit 103. Additionally, the SINR estimation unit 158 reads the location information of each of the other sectors stored in the storage unit 103. Subsequently, the SINR estimation unit 158 calculates the distance between the local sector and each of the other sectors based on the location information of the local sector and the location information of each of the other sectors. Additionally, the SINR estimation unit 158 performs the weighting process for the utilization ratio β of PDCCH and the utilization ratio γ of PDSCH corresponding to the other sector such that the values become large as the distance between the other sector and the local sector reduces.

The quality of PDCCH ($SINR_{PDCCH}$) corresponding to the local sector is defined by the following Equation (3) based on the signal power (SignalPower) of PDCCH corresponding to the local sector, the interference power (InterferencePower) of PDCCH corresponding to the local sector, and the utilization ratio $\beta 1_j$; after weighting of PDCCH corresponding to the j-th other sector. Furthermore, the quality of PDSCH (SINR$_{PDSCH}$) corresponding to the local sector is defined by the following Equation (4) based on the signal power (SignalPower) of PDCCH corresponding to the local sector, the interference power (InterferencePower) of PDCCH corresponding to the local sector, and the utilization ratio $\gamma 1_j$ after weighting of PDSCH corresponding to the j-th other sector.

$$SINR_{PDCCH} = \frac{SignalPower}{\sum_{j \neq ServingSector}^{NumSector} \beta 1_j \cdot InterferencePower_j + NoisePower} \quad \text{[Equation 3]}$$

$$SINR_{PDSCH} = \frac{SignalPower}{\sum_{j \neq ServingSector}^{NumSector} \gamma 1_j \cdot InterferencePower_j + NoisePower} \quad \text{[Equation 4]}$$

In the present embodiment, if the noise power (NoisePower) is assumed to be so small that it can be ignored, the Equation (3) is converted to the following Equation (5), and the Equation (4) is converted to the following Equation (6).

$$SINR_{PDCCH} = \frac{SignalPower}{\sum_{j \neq ServingSector}^{NumSector} \beta 1_j \cdot InterferencePower_j} \quad \text{[Equation 5]}$$

$$SINR_{PDSCH} = \frac{SignalPower}{\sum_{j \neq ServingSector}^{NumSector} \gamma 1_j \cdot InterferencePower_j} \quad \text{[Equation 6]}$$

Here, if SINR corresponding to the measured W-CQI corresponding to the local sector is assumed to be same as the quality of PDSCH (SINR$_{PDSCH}$) corresponding to the local sector shown by the Equation (6), the utilization ratio after weighting of PDCCH corresponding to all of the other sectors is assumed to be the same at B, and the utilization ratio after weighting of PDSCH corresponding to all of the other sectors is assumed to be the same at y, the Equation (5) is converted to the below Equation (7).

$$SINR_{PDCCH} = \frac{SignalPower}{\sum_{j \neq ServingSector}^{NumSector} \beta 1_j \cdot InterferencePower_j} \quad \text{[Equation 7]}$$

$$= \gamma \cdot \left( \frac{SignalPower}{\sum_{j \neq ServingSector}^{NumSector} InterferencePower_j} \cdot \frac{1}{\gamma} \right) \cdot \frac{1}{\beta}$$

$$= \gamma \cdot SINR_{PDSCH} \cdot \frac{1}{\beta}$$

$$= SINR_{PDSCH} \cdot \frac{\gamma}{\beta}$$

If Equation (7) is in decibel value, it is converted to $$Estim \cdot SINR = SINR_{PDSCH} + 10 \log(\gamma) - 10 \log(\beta). \quad \text{[Equation 8]}$$

Here, Estim.SINR is the decibel value of the estimated SINR of PDCCH corresponding to the local sector, SINR$_{PDCCH}$ is SINR shown by the measured W-CQI corresponding to the local sector, that is, the decibel value of the quality of PDSCH (SINR$_{PDSCH}$) corresponding to the local sector.

The SINR estimation unit 158 estimates the quality of PDCCH (SINR) corresponding to the local sector by using the above Equation (5), Equation (7), or Equation (8).

On the other hand, the following process is executed when the quality of PDCCH corresponding to the local sector is estimated using a correction value.

In the storage unit 103, the difference between the SINR of PDCCH corresponding to the local sector and the SINR obtained from the measured W-CQI corresponding to the local sector is stored as a correction value for each utilization ratio $\beta$ of PDCCH corresponding to the other sector and the utilization ratio $\gamma$ of PDSCH corresponding to the other sector.

The SINR estimation unit 158 reads the correction value corresponding to the utilization ratio $\beta$ of PDCCH corresponding to the other sector and the utilization ratio $\gamma$ of PDSCH corresponding to the other sector from the storage unit 103.

When the calculation equation of estimated SINR of PDCCH corresponding to the local sector using a correction value (Offset) is represented in decibel value, it becomes the following Equation (9).

$$Estim \cdot SINR = SINR_{PDSCH} + Offset \quad \text{[Equation 9]}$$

The SINR estimation unit 158 can calculate the estimated SINR of PDCCH corresponding to the local sector in a decibel value by assigning the measured W-CQI corresponding to the local sector, that is, by substituting the decibel value of the quality of PDSCH (SINR$_{PDSCH}$) corresponding to the local sector and the correction value read from the storage unit 103 in the Equation (9).

The PDCCH AL decision unit 160 decides the AL such that the AL becomes less as the quality of PDCCH (SINR) corresponding to the local sector estimated by the SINR estimation unit 158 becomes better.

The PDCCH assignment processing unit 162 assigns PDCCH of RB to the radio terminal 2A within the local sector. At this point, the PDCCH assignment processing unit 162 operates such that the number of repetitions at the time of repeatedly storing DCI corresponding to the radio terminal 2A in PDCCH of a single TTI becomes the AL decided by the PDCCH AL decision unit 160. The information of the assigned PDCCH, that is, the information that can uniquely identify PDCCH is transmitted to the radio terminal 2A via the radio communication unit 105 and the antenna 107.

(2) Operation Of Radio Base Station

Figure 7:
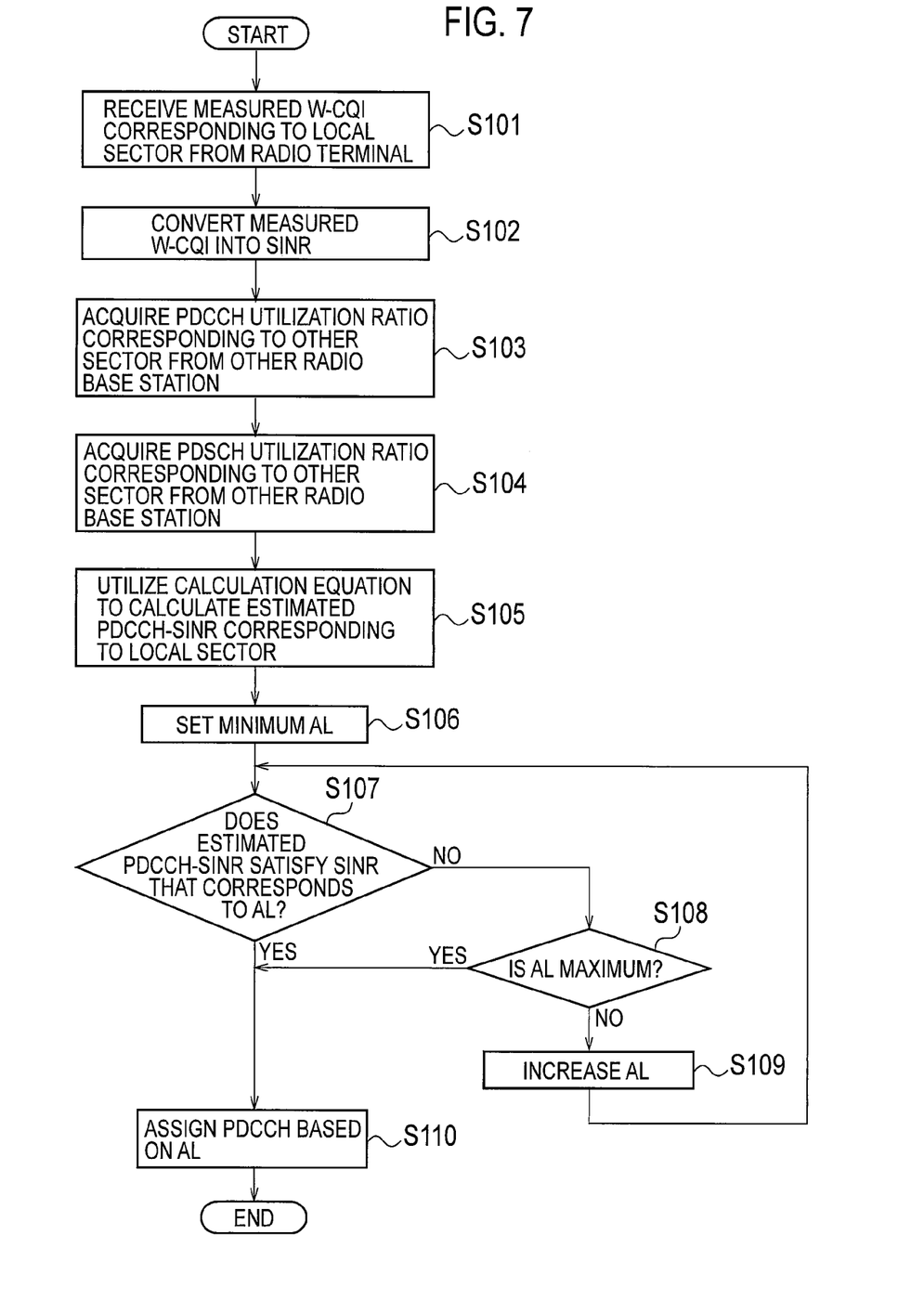
FIG. 7 is a flowchart showing a first operation of PDCCH quality estimation in the radio base station according to the embodiment of the present invention.

FIG. 7 is a flowchart showing an operation of PDCCH quality estimation using a calculation equation in the radio base station 1A.

In step S101, the control unit 102 of the radio base station 1A receives the measured W-CQI corresponding to the local sector from the radio terminal 2A.

In step S102, the control unit 102 converts the measured W-CQI to SINR.

In step S103, the control unit 102 acquires the utilization ratio $\beta$ of PDCCH corresponding to the other sector from the radio base station 1B and the radio base station 1C.

In step S104, the control unit 102 acquires the utilization ratio $\gamma$ of PDSCH corresponding to the other sector from the radio base station 1B and the radio base station 1C.

In step S105, the control unit 102 calculates the estimated quality of PDCCH (estimated PDCCH-SINR) corresponding to the local sector based on SINR obtained from the measured W-CQI corresponding to the local sector, the utilization ratio β of PDCCH corresponding to the other sector, and the utilization ratio γ of PDSCH corresponding to the other sector by using the calculation equation (7) or (8).

In step S106, the control unit 102 sets the minimum AL as the initial value.

In step S107, the control unit 102 determines whether or not the estimated PDCCH-SINR satisfies the SINR corresponding to the AL set currently.

If the estimated PDCCH-SINR does not satisfy the SINR corresponding to the AL set, then in step S108, the control unit 102 determines whether or not the AL is maximum.

If the AL is not maximum, then in step S109, the control unit 102 increases the AL. Following this, the operation after determining whether or not the estimated PDCCH-SINR satisfies the SINR corresponding to the AL set (in step S107) is repeated.

On the other hand, if it is determined in step S107 that the estimated PDCCH-SINR satisfies the SINR corresponding to the AL set, or it is determined in step S108 that the AL is maximum, then in step S110, the control unit 102 assigns PDCCH to the radio terminal 2A based on the AL set.

Figure 8:
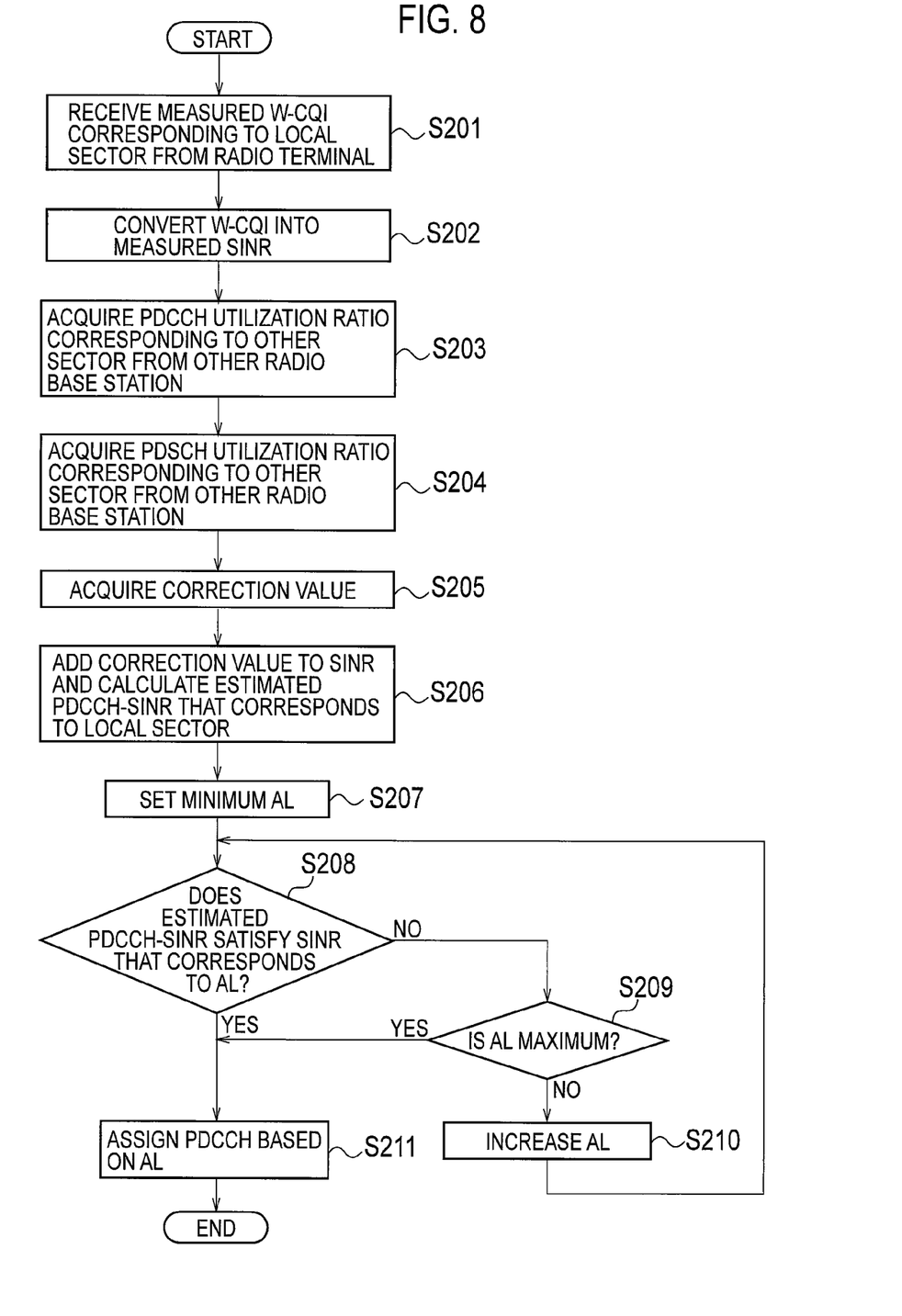
FIG. 8 is a flowchart showing a second operation of the PDCCH quality estimation in the radio base station according to the embodiment of the present invention.

FIG. 8 is a flowchart showing an operation of PDCCH quality estimation using a correction value in the radio base station 1A.

The operation of step S201 through step S204 is same as the operation of step S101 through step S104 of FIG. 7. Therefore, its explanation is omitted.

In step S205, the control unit 102 acquires a correction value corresponding to the acquired utilization ratio β of PDCCH corresponding to the other sector and the utilization ratio γ of PDSCH corresponding to the other sector.

In step S206, the control unit 102 adds up the correction value and the SINR obtained from the measured W-CQI corresponding to the local sector based on the Equation (9), and then calculates the estimated quality of PDCCH (SINR) corresponding to the local sector.

The operation of step S207 through step S211 is same as the operation of step S106 through step S110 of FIG. 7. Therefore, its explanation is omitted.

(3) Operation And Effect

Figure 9:
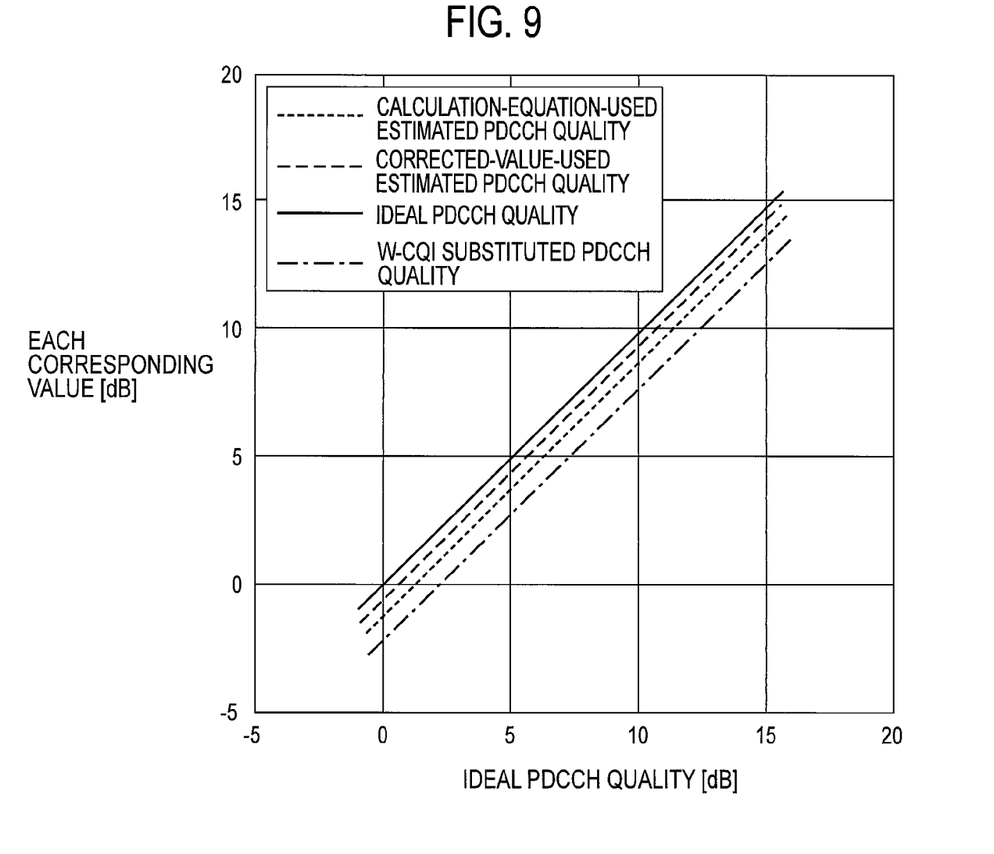
FIG. 9 is a diagram showing a correspondence relationship among the ideal PDCCH quality, the W-CQI substituted PDCCH quality, a calculation-equation-used estimated PDCCH quality, and a corrected-value-used estimated PDCCH quality.

FIG. 9 is a diagram showing a correspondence relationship among the ideal PDCCH quality, the W-CQI substituted PDCCH quality, the estimated PDCCH quality when the calculation equation (7) or the calculation equation (8) is used (calculation-equation-used estimated PDCCH quality), and the estimated PDCCH quality when a correction value is used (corrected-value-used estimated PDCCH quality).

As shown in FIG. 9, both the calculation-equation-used estimated PDCCH quality and the corrected-value-used estimated PDCCH quality obtained in the present embodiment have values closer to the ideal PDCCH quality rather than the W-CQI substituted PDCCH quality that was conventionally used as PDCCH corresponding to the local sector. That is, both the calculation-equation-used estimated PDCCH quality and the corrected-value-used estimated PDCCH quality have more appropriate estimated values of PDCCH than the conventional values.

Figure 10:
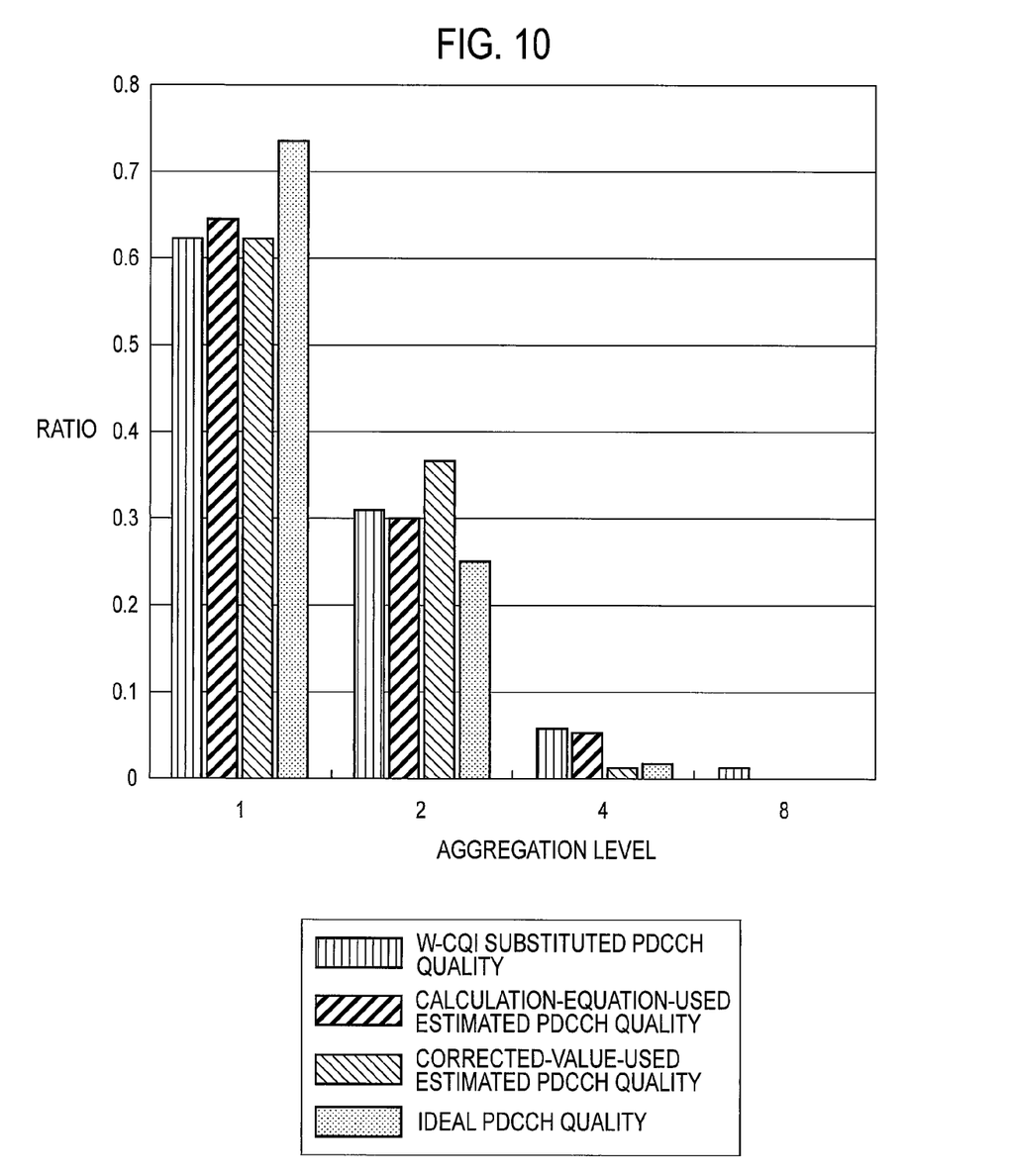
FIG. 10 is a diagram showing a distribution of AL, when each of the ideal PDCCH quality, the W-CQI substituted PDCCH quality, the calculation-equation-used estimated PDCCH quality, and the corrected-value-used estimated PDCCH quality satisfies the SINR corresponding to the AL.

FIG. 10 is a diagram showing a distribution of AL, when each of the ideal PDCCH quality, W-CQI substituted PDCCH quality, the calculation-equation-used estimated PDCCH quality, and offset-value-used estimated PDCCH quality satisfies the SINR corresponding to the AL. As shown in FIG. 10, the distribution of AL in the calculation-equation-used estimated PDCCH quality and the offset-value-used estimated PDCCH quality moves towards the side with lower AL as compared to the distribution of AL in the W-CQI substituted PDCCH quality, and is closer to the distribution of AL in the ideal PDDCH quality.

Figure 11:
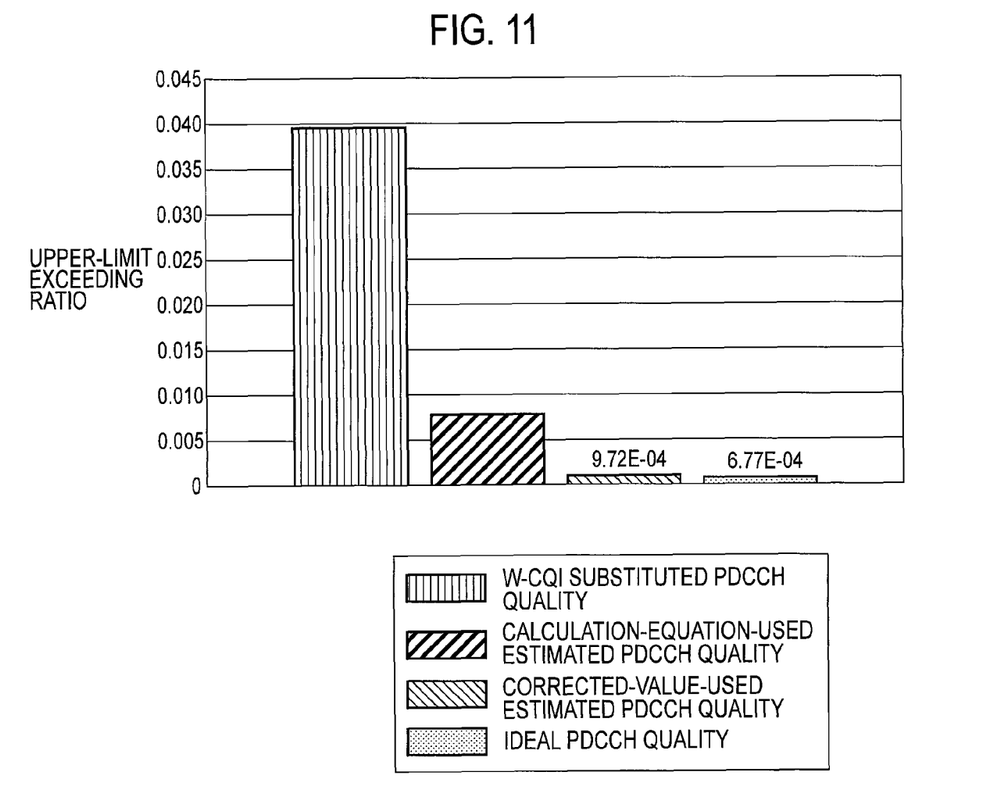
FIG. 11 is a diagram showing an upper-limit exceeding ratio in each of the ideal PDCCH quality, the W-CQI substituted PDCCH quality, the calculation-equation-used estimated PDCCH quality, and an offset-value-used estimated PDCCH quality.

FIG. 11 is a diagram showing the ratio (upper-limit exceeding ratio) over which DCI cannot enter PDCCH in each of the ideal PDCCH quality, the W-CQI substituted PDCCH quality, the calculation-equation-used estimated PDCCH quality, and the corrected-value-used estimated PDCCH quality. As shown in FIG. 11, the upper-limit exceeding ratio in the calculation-equation-used estimated PDCCH quality and the corrected-value-used estimated PDCCH quality is remarkably lower than the upper-limit exceeding ratio in W-CQI substituted PDCCH quality, and is closer to the upper-limit exceeding ratio in the ideal PDCCH quality.

Thus, in the radio communication system 10 of the present embodiment, the radio base station 1A acquires the utilization ratio β of PDCCH corresponding to the other sector and the utilization ratio γ of PDSCH corresponding to the other sector from the radio base station 1B and the radio base station 1C, and by finding out the calculation-equation-used estimated PDCCH quality and the corrected-value-used estimated PDCCH quality as the estimated quality of PDCCH corresponding to the local sector based on these values, an estimated value closer to the ideal PDCCH quality than the conventional W-CQI substituted PDCCH quality can be acquired.

(4) Other Embodiments

While the present invention has been described by way of the foregoing embodiments, it should not be understood that those descriptions and drawings constituting a part of the present disclosure limit the present invention. Further, various substitutions, examples, or operational techniques shall be apparent to a person skilled in the art based on this disclosure.

In the aforementioned embodiment, the radio base station 1A acquired the utilization ratio β of PDCCH corresponding to the other sector and the utilization ratio γ of PDSCH corresponding to the other sector from the radio base station 1B and the radio base station 1C, but either one of these can also be acquired.

For example, if the radio base station 1A acquires only the utilization ratio β of PDCCH corresponding to the other sector from the radio base station 1B and the radio base station 1C, all PDSCH corresponding to the other sectors are used and their utilization ratio γ is assumed to be 1.

Furthermore, if the radio base station 1A acquires only the utilization ratio γ of PDSCH corresponding to the other sector from the radio base station 1B and the radio base station 1C, the utilization ratio β of PDCCH corresponding to the other sector is assumed to be same as the utilization ratio of PDSCH corresponding to the local sector.

Furthermore, in the above embodiment, the cell 3A through the cell 3C were divided into a plurality of sectors, but the present invention can be applied in a similar way even when the cells are not divided into sectors. In such a case, the power of PDCCH and PDCCH corresponding to other cell (the other cell) having the same frequency band as the local sector acts as interference to the PDSCH and PDCCH corresponding to the cell 3A which is a local cell formed by the radio base station 1A. In accordance with the interference, the control unit 102 in the radio base station 1A finds out the calculation-equation-used estimated PDCCH quality and the corrected-value-used estimated PDCCH quality corresponding to the local cell in place of the calculation-equation-used estimated PDCCH quality and the corrected-value-used estimated PDCCH quality corresponding to the aforementioned local sector.

Thus, it must be understood that the present invention includes various embodiments that are not described herein. Therefore, the present invention is limited only by the specific features of the invention in the scope of the claims reasonably evident from the disclosure above.

The entire contents of Japanese Patent Application No. 2009-172954 (filed on Jul. 24, 2009) are incorporated in the present specification by reference.

Industrial Applicability

The communication control method according to the present invention enables appropriate estimation of the quality of a radio resource and is useful as a communication control method.

The invention claimed is:

1. A radio base station forming a predetermined cell or sector, assigning a radio resource to a radio terminal, and performing a communication with the radio terminal, wherein
    a radio resource corresponding to the predetermined cell or sector includes a radio resource for transmitting control information and a radio resource for transmitting user data,
    the radio base station comprising:
    a first acquisition unit configured to acquire an average quality of a radio resource for transmitting user data included in the radio resource corresponding to the predetermined cell or sector;
    a second acquisition unit configured to acquire at least either one of an utilization ratio of a radio resource for transmitting control information or an utilization ratio of a radio resource for transmitting user data, included in a radio resource corresponding to other cell or other sector formed by other radio base station, from the other radio base station;
    an estimation unit configured to estimate a quality of a radio resource for transmitting control information included in the radio resource corresponding to the predetermined cell or sector based on the average quality of the radio resource for transmitting user data acquired by the first acquisition unit, and at least either one of the utilization ratio of the radio resource for transmitting control information or the utilization ratio of the radio resource for transmitting user data acquired by the second acquisition unit; and
    an assignment unit configured to assign the radio resource for transmitting control information to the radio terminal based on the estimated quality of the radio resource for transmitting control information.

2. The radio base station according to claim 1, wherein the estimation unit calculates the quality of the radio resource for transmitting control information included in the radio resource corresponding to the predetermined cell or sector, by multiplying the average quality of the radio resource for transmitting user data to a value obtained by dividing the utilization ratio of the radio resource for transmitting user data by the utilization ratio of the radio resource for transmitting control information.

3. The radio base station according to claim 1, wherein the estimation unit calculates a correction value with respect to the average quality of the radio resource for transmitting user data based on the utilization ratio of the radio resource for transmitting control information, and calculates the quality of the radio resource for transmitting control information included in the radio resource corresponding to the predetermined cell or sector by adding the correction value to the average quality of the radio resource for transmitting user data.

4. The radio base station according to any one of claim 1 to claim 3, comprising a third acquisition unit configured to acquire a location of the radio terminal, wherein
    the estimation unit performs weighting for at least either one of the utilization ratio of a radio resource for transmitting control information or the utilization ratio of a radio resource for transmitting user data, included in a radio resource corresponding to the other cell or the other sector, in accordance with a distance from the location of the radio terminal up to the location of the other cell or the other sector.

5. The radio base station according to any one of claim 1 to claim 4, wherein the estimation unit performs weighting for at least either one of the utilization ratio of a radio resource for transmitting control information or the utilization ratio of a radio resource for transmitting user data included in a radio resource corresponding to the other cell or the other sector in accordance with the distance from the location of the predetermined cell or sector up to the location of the other cell or the other sector.

6. A communication control method of a radio base station forming a predetermined cell or sector, assigning a radio resource to a radio terminal, and performing a communication with the radio terminal, wherein
    a radio resource corresponding to the predetermined cell or sector includes a radio resource for transmitting control information and a radio resource for transmitting user data,
    the communication control method comprising the steps of:
    a step in which the radio base station acquires an average quality of a radio resource for transmitting user data included in a radio resource corresponding to the predetermined cell or sector;
    a step in which the radio base station acquires at least either one of an utilization ratio of a radio resource for transmitting control information or an utilization ratio of a radio resource for transmitting user data, included in a radio resource corresponding to other cell or other sector formed by other radio base station, from the other radio base station;
    a step in which the radio base station estimates the quality of a radio resource for transmitting control information included in the radio resource corresponding to the predetermined cell or sector based on the obtained average quality of the radio resource for transmitting user data, and at least either one of the acquired utilization ratio of the radio resource for transmitting control information or the acquired utilization ratio of the radio resource for transmitting user data; and
    a step of assigning the radio resource for transmitting control information to the radio terminal based on the estimated quality of the radio resource for transmitting control information.

* * * * *